United States Patent
Mei et al.

(10) Patent No.: US 9,616,886 B2
(45) Date of Patent: Apr. 11, 2017

(54) SIZE ADJUSTMENT OF FORWARD OBJECTS FOR AUTONOMOUS VEHICLES

(71) Applicant: Toyota Motor Engineering & Manufacturing North America, Inc., Erlanger, KY (US)

(72) Inventors: Xue Mei, Ann Arbor, MI (US); Naoki Nagasaka, Ann Arbor, MI (US); Bunyo Okumura, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/801,019

(22) Filed: Jul. 16, 2015

(65) Prior Publication Data

US 2017/0015313 A1    Jan. 19, 2017

(51) Int. Cl.
*B60W 30/09* (2012.01)
*G05D 1/00* (2006.01)
*B60W 10/20* (2006.01)
*B60W 10/04* (2006.01)

(52) U.S. Cl.
CPC ............ *B60W 30/09* (2013.01); *B60W 10/04* (2013.01); *B60W 10/20* (2013.01); *G05D 1/0088* (2013.01); *B60W 2550/10* (2013.01); *B60W 2550/30* (2013.01); *B60W 2710/20* (2013.01); *B60W 2720/10* (2013.01)

(58) Field of Classification Search
CPC .... G05D 1/0088; B60W 30/09; B60W 10/20; B60W 10/04; B60W 2710/20; B60W 2550/30; B60W 2720/10; B60W 2550/10

USPC ........................................................... 701/23
See application file for complete search history.

(56) References Cited

U.S. PATENT DOCUMENTS

| | | | |
|---|---|---|---|
| 4,931,930 A * | 6/1990 | Shyu | B60Q 9/007 180/167 |
| 7,046,841 B1 | 5/2006 | Dow et al. | |
| 7,991,550 B2 * | 8/2011 | Zeng | G01S 7/4026 340/435 |
| 8,027,029 B2 | 9/2011 | Lu et al. | |
| 8,351,684 B2 | 1/2013 | Clar et al. | |
| 8,594,927 B2 | 11/2013 | Louis et al. | |
| 8,605,998 B2 | 12/2013 | Samples et al. | |
| 8,766,975 B2 | 7/2014 | Mohr et al. | |
| 9,128,185 B2 * | 9/2015 | Zeng | G01S 17/66 |

(Continued)

OTHER PUBLICATIONS

Mertz et al.; "Moving Object Detection with Laser Scanners"; Journal of Field Robotics; 2013; pp. 17-43; vol. 30, Issue 1; 2012 Wiley Periodicals, Inc.; (27 pages).

(Continued)

*Primary Examiner* — Tyler J Lee
(74) *Attorney, Agent, or Firm* — Christopher G. Darrow; Darrow Mustafa PC

(57) ABSTRACT

Systems and methods relating to the operation of an autonomous vehicle relative to forward objects in an external environment are described. At least a forward portion of the external environment can be sensed to detect an object therein. A size adjustment factor can be determined to predict a laterally innermost point of the detected object relative to the autonomous vehicle. A driving maneuver for the autonomous vehicle can be determined based at least partially on the predicted laterally innermost point of the detected object relative to the autonomous vehicle.

18 Claims, 7 Drawing Sheets

(56) References Cited

U.S. PATENT DOCUMENTS

2012/0116662 A1* 5/2012 Zeng ............... G05D 1/024
 701/300
2013/0242284 A1 9/2013 Zeng
2013/0243247 A1* 9/2013 Sakaue ............. G01B 11/25
 382/103

OTHER PUBLICATIONS

Kovavisaruch et al.; "Accuracy Improvement Method for Vehicle Detection Using Optical Sensors"; IEEE; 2009; pp. 218-222; (5 pages).
Cho et al.; "A Multi-Sensor Fusion System for Moving Object Detection and Tracking in Urban Driving Environments"; 2014 IEEE International Conference on Robotics & Automation (ICRA); May 31-Jun. 7, 2014; pp. 1836-1843; Hong Kong, China; (8 pages).
Darms et al.; "Obstacle Detection and Tracking for the Urban Challenge"; IEEE Transactions on Intelligent Transportation Systems; Sep. 2009; pp. 475-485; vol. 10, No. 3; (11 pages).
Golovinskiy et al.; "Shape-baesd Recognition of 3D Point Clouds in Urban Environments"; 2009 IEEE 12th International Conference on Computer Vision (ICCV); pp. 2154-2161 (8 pages).
Mei et al.; "Detection and Motion Planning for Roadside Parked Vehicles at Long Distance"; 2015 IEEE Intelligent Vehicles Symposium; Jun. 28-Jul. 1, 2015; pp. 1-6; Ceox, Seol, Korea; (6 pages).
Felzenszwalb et al.; "Efficient Graph-Based Image Segmentation"; International Journal of Computer Vision; Sep. 2004; pp. 1-26; vol. 59, No. 2; (26 pages).
Takagi et al.; "Road Environment Recognition Using On-Vehicle Lidar"; Jan. 2006; pp. (9 pages).

* cited by examiner

SIZE ADJUSTMENT OF FORWARD OBJECTS FOR AUTONOMOUS VEHICLES

FIELD

The subject matter described herein relates in general to vehicles having an autonomous operational mode and, more particularly, to the operation of such vehicles relative to objects located forward of the vehicle.

BACKGROUND

Some vehicles include an operational mode in which a computing system is used to navigate and/or maneuver the vehicle along a travel route with minimal or no input from a human driver. Such vehicles are equipped with sensors that are configured to detect information about the surrounding environment, including the presence of objects in the environment. The computing systems are configured to process the detected information to determine how to navigate and/or maneuver the vehicle through the surrounding environment. The size of such objects may affect the determination of how to navigate and/or maneuver the vehicle through the surrounding environment.

SUMMARY

In one respect, the present disclosure is directed to a method of operating an autonomous vehicle relative to forward objects. The method can include detecting an object located forward of the autonomous vehicle. The method can include determining a size adjustment factor to the detected object to predict a laterally innermost point of the detected object relative to the autonomous vehicle. The method can also include determining a driving maneuver for the autonomous vehicle based at least partially on the predicted laterally innermost point of the detected object relative to the autonomous vehicle.

In another respect, the present disclosure is directed to a system for operating an autonomous vehicle relative to forward objects. The system includes a sensor system. The sensor system can be configured to sense at least a forward portion of the external environment to detect an object located forward of the autonomous vehicle. The system can also include a processor operatively connected to the sensor system. The processor can be programmed to initiate executable operations. The executable operations can include determining a size adjustment factor to the detected object to predict a laterally innermost point of the detected object relative to the autonomous vehicle. The executable operations can also include determining a driving maneuver for the autonomous vehicle based at least partially on the predicted laterally innermost point of the detected object relative to the autonomous vehicle.

In yet another respect, the present disclosure is directed to a computer program product for operating an autonomous vehicle relative to forward objects. The computer program product includes a computer readable storage medium having program code embodied therein. The program code can be executable by a processor to perform a method. The method can include detecting an object located forward of the autonomous vehicle. The method can also include determining a size adjustment factor to the detected object to predict a laterally innermost point of the detected object relative to the autonomous vehicle. The method can further include determining a driving maneuver for the autonomous vehicle based at least partially on the predicted laterally innermost point of the detected object relative to the autonomous vehicle.

DETAILED DESCRIPTION

Figure 1:
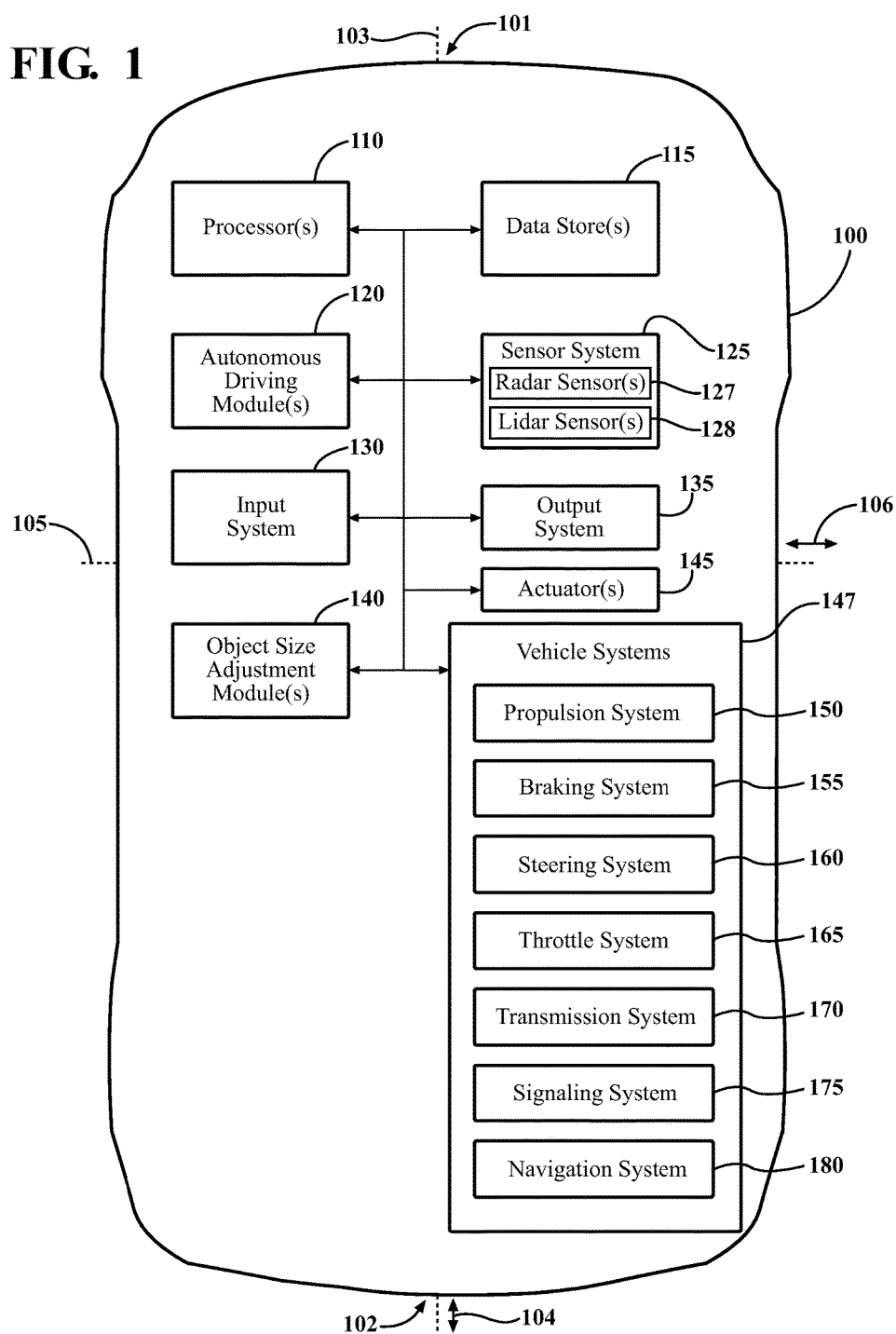
FIG. 1 is an example of an autonomous vehicle configured to operate relative to forward objects.

This detailed description relates to the operation of an autonomous vehicle relative to objects located forward of the autonomous vehicle. A size adjustment factor can be determined to predict a laterally innermost point of a detected forward object relative to the autonomous vehicle. A driving maneuver for the autonomous vehicle can be determined based at least partially on the predicted laterally innermost point of the detected object relative to the autonomous vehicle. The present detailed description relates to systems, methods and computer program products that incorporate such features. In at least some instances, such systems, methods and computer program products can improve safety and/or performance of an autonomous vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

According to arrangements herein, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated. In some instances, the vehicle 100 can be configured to be selectively switched between an autonomous mode and a manual mode. Such switching can be implemented in any suitable manner, now known or later developed. "Manual mode" means that a majority of the navigation and/or maneuvering of the vehicle along a travel route is performed by a human driver.

The vehicle 100 can have a forward end 101 and a rearward end 102. The vehicle 100 can have an associated longitudinal axis 103, which can be the central axis of the vehicle 100. The vehicle 100 can have an associated longitudinal direction 104. "Longitudinal direction" means any direction that is substantially parallel to and/or co-linear with the longitudinal axis 103. The vehicle 100 can have an associated lateral axis 105, which can be substantially perpendicular to the longitudinal axis 103. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 106. "Lateral direction" means any direction that is substantially parallel to and/or co-linear with the lateral axis 105.

The vehicle 100 can include various elements, some of which may be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

The vehicle 100 can include an autonomous driving module 120. The autonomous driving module 120 can be implemented as computer readable program code that, when executed by a processor, implement various processes described herein, including, for example, determining a travel route for the autonomous vehicle, determining one or more driving maneuvers for the autonomous vehicle, implementing a determined travel route or driving maneuver, and/or causing a determined travel route or driving maneuver to be implemented. The autonomous driving module 120 can be a component of the processor 110, or the autonomous driving module 120 can be executed on and/or distributed among other processing systems to which the processor 110 is operatively connected.

The autonomous driving module 120 can include instructions (e.g., program logic) executable by the processor 110. Such instructions can include instructions to execute various vehicle functions and/or to transmit data to, receive data from, interact with, and/or control the vehicle 100 or one or more systems thereof (e.g. one or more of vehicle systems 147). Alternatively or in addition, the data store 115 may contain such instructions.

The vehicle 100 can include a sensor system 125. The sensor system 125 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 125 includes a plurality of sensors, the sensors can work independently from each other. Alternatively, two or more of the sensors can work in combination with each other. In such case, the two or more sensors can form a sensor network. The sensor system 125 and/or the one or more sensors can be operatively connected to the processor 110, the data store 115, the autonomous driving module 120 and/or other element of the vehicle 100 and/or the autonomous driving system.

The sensor system 125 can include any suitable type of sensor. For example, the sensor system 125 can include one or more sensors configured to detect, determine, assess, monitor, measure, quantify and/or sense information about the vehicle 100. Alternatively or in addition, the sensor system 125 can include one or more sensors configured to detect, determine, assess, monitor, measure, quantify and/or sense information about the external environment in which the vehicle 100 is located, including information about objects in the external environment. Such objects may be stationary object or moving objects. Alternatively or in addition to one or more of the above examples, the sensor system 125 can include one or more sensors configured to detect, determine, assess, monitor, measure, quantify and/or sense the location of the vehicle 100 and/or the location of objects in the environment relative to the vehicle 100. Various examples of these and other types of sensors will be described herein. It will be understood that the embodiments are not limited to the particular sensors described.

The sensor system 125 can include one or more sensors configured to detect, determine, assess, monitor, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can monitor one or more internal systems of the vehicle 100 (e.g., an $O_2$ monitor, a fuel gauge, an engine oil temperature, coolant temperature, etc.).

The sensor system 125 can include one or more sensors configured to sense the external environment of the vehicle 100. Such environment sensors can be configured to detect, determine, assess, monitor, measure, quantify and/or sense objects in at least a portion of the external environment of the vehicle 100 and/or information/data about such objects. Various examples of such sensors will be described herein. However, it will be understood that the embodiments are not limited to the particular sensors described.

In one or more arrangements, the sensor system 125 can include one or more radar sensors 127. "RADAR sensor" means any device, component and/or system that can detect, determine, assess, monitor, measure, quantify and/or sense something using at least in part radio signals. The one or more radar sensors 127 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object and/or the movement of each detected object. The one or more radar sensors 127, or data obtained thereby, can determine the speed of objects in the external environment of the vehicle 100. The one or more radar sensors 127 can have three dimensional coordinate data associated with it the objects. However, in some instances, the one or more radar sensors 127 may lack horizontal accuracy.

In one or more arrangements, the sensor system 125 can include one or more lidar sensors 128. "Lidar sensor" means any device, component and/or system that can detect, determine, assess, monitor, measure, quantify and/or sense something using at least in part lasers. For instance, the one or more lidar sensors 128 can be or can be included as part of a laser rangefinder or a lidar. Such devices can include a laser source and/or laser scanner configured to emit a laser and a detector configured to detect reflections of the laser. The laser rangefinder or lidar may be configured to operate in a coherent or an incoherent detection mode.

The one or more lidar sensors 128 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object, and/or the movement of each detected object.

The one or more lidar sensors 128 can detect a plurality of data points for objects in the external environment. The object data points can have associated three dimensional coordinate data. It should be noted that, at long distances (e.g., at least about 80 meters away), a relatively small number of object data points may be collected with respect to an object.

The laser signals can originate from a common source or location. For instance, referring to FIG. 3, the lidar sensor can include a laser source, which can emit a laser signal 365. The laser signal can have a substantially conical shape. In the two dimensional view of FIG. 3, the laser signal can appear to have two non-parallel outer walls. As such, an interior angle can be defined by the conical laser signal. This angle can be referred to as the resolution angle ($\theta$). The point detected or observed by the laser signal can be substantially at the center of the conical laser signal. The distance between the lidar sensor (or the laser signal source) and the object impinged upon by the laser signal (e.g. vehicle 350) is the length (R) and, more particularly, the distance between the lidar sensor (or the laser signal source) and the object at the center of the laser signal. Alternatively, in one or more arrangements, the resolution angle ($\theta$) can be defined as the angle between two separate, neighboring laser signals originating from the same laser source.

Alternatively or in addition to any of the sensors described above, the sensor system 125 can include other types of sensors. As an example, the sensor system 125 can include one or more ultrasonic sensors (not shown). The sensor system 125, the processor 110, and/or one or more other elements of the vehicle 100 can be operable to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100. In one or more arrangements, the one or more of the radar sensors 127 and one or more of the lidar sensors 128 can be operatively positioned to sense a forward portion of the external environment of the vehicle 100. "Forward portion" means a portion of the external environment that is located in front of the vehicle in the travel direction of the vehicle. Similarly, "forward object" means an object in the external environment that is located in front of the vehicle in the travel direction of the vehicle.

The vehicle 100 can include an input system 130. An "input system" is defined as any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" is defined as any device, component, system, element or arrangement or groups thereof that enable information/data to be presented to a vehicle occupant (e.g. a person, a vehicle occupant, etc.). The output system 135 can present information/data to a vehicle occupant. The output system 135 can include a display, as described above. Alternatively or in addition, the output system 135 may include a microphone, earphone and/or speaker. Some components of the vehicle 100 may serve as both a component of the input system 130 and a component of the output system 135.

The vehicle 100 can include an object size adjustment module 140. The object size adjustment module 140 can be implemented as computer readable program code that, when executed by a processor, implement the various processes described herein. The object size adjustment module 140 can be a component of the processor 110, or the object size adjustment module 140 can be executed on and/or distributed among other processing systems to which the processor 110 is operatively connected.

In some instances, the sensor system 125 may not accurately capture the size of an object, as the sensors may only detect a portion of the object (e.g., only a portion of one or more sides of an object) for one or more reasons (e.g., distance from the object, weather conditions, sensor resolution, orientation of the object, etc.). The object size adjustment module 140 can be configured to determine or predict an inner boundary of the object. "Inner boundary" means a point, line, plane, or contour of the object that is located closest to a reference vehicle in a lateral direction of the vehicle. The inner boundary may or may not actually overlap the actual inner boundary of the object. The object size adjustment module 140 can determine or predict the inner boundary of the object so that it be used at least in part to determine future driving maneuvers the vehicle 100. In this way, the likelihood of having to implement drastic driving maneuvers of the vehicle 100 as the vehicle 100 approaches or passes the detected object are minimized or avoided.

In one or more arrangements, the object size adjustment module 140 can be configured to increase the size of a detected object to account for uncertainties that may be introduced by one or more factors (e.g., the resolution of the one or more lidar sensors 128). For instance, when an object is detected, the laser of the lidar sensor(s) 128 may not provide enough information about the size of the object or how close the object is to the vehicle 100 in the lateral direction 106 of the vehicle 100. As an example, if a stationary object is located near the current travel lane of the vehicle (e.g., another vehicle parked on the right side of a road), information about the size of the object and/or the distance between the vehicle 100 and the object in the lateral direction 106 may not be obtained due to the resolution of the horizontal scanning angle of the lidar sensor(s) 128.

The object size adjustment module 140 can be configured to determine or predict an inner boundary of the object. The lidar sensor(s) 128 can collect a plurality of points for an object in the environment. The points for an object can be distributed according to a shape profile. For instance, at least with respect to certain stationary objects located on or alongside the current road of the vehicle, the lidar sensor data of object can appear in one of a limited number of shape profiles. For instance, with respect to stationary vehicles on or along the road (e.g., a parked or standing vehicle), the vehicle appear as one of two shape profiles in the point cloud obtained by the lidar sensor(s) 128. As an example, the shape profile can be a substantially linear, or the shape profile can be substantially L-shaped. Based at least in part on the shape profile of the detected object, a size adjustment factor can be determined to predict a laterally innermost point of the detected object relative to the autonomous vehicle. Each of the shape profiles will be discussed in turn below.

When the detected shape profile of the detected object has a substantially linear shape profile, a line can be fit to the data points. The determination of a size adjustment factor to predict a laterally innermost point of the detected object relative to the autonomous vehicle can include identifying a laterally innermost detected point relative to the autonomous vehicle. The determination can also include adding the size adjustment factor to the laterally innermost detected point of the object. The size adjustment factor can be added in any suitable direction. For instance, the size adjustment factor can be added along the fitted line toward the vehicle 100. Alternatively, the size adjustment factor can be added in the lateral direction 106 toward the vehicle 100.

The size adjustment factor can be determined in any suitable manner. For instance, the size adjustment factor can be a predetermined distance, or it can be a distance established according to a predefined equation. As an example, the size adjustment factor can be defined by the following equation: $R*\sin(\theta/2)$. In this equation, R is the distance between a sensor of the autonomous vehicle (e.g., the lidar sensor) and the laterally innermost detected point relative to the autonomous vehicle. In this equation, $\theta$ is the sensor resolution angle.

When the detected shape profile of the detected object has a substantially L-shaped profile, a first line can be fit to a first substantially linear portion of the data points, and a second line can be fit to a second substantially linear portion of the data points. The second substantially linear portion can be transverse to the first substantially linear portion. An intersection point can be formed between the first substantially linear portion and a second substantially linear portion. The size adjustment factor can be added to the intersection point. The size adjustment factor can be added in any suitable direction. For instance, the size adjustment factor can be added to the intersection point in the direction of the first substantially linear portion away from the vehicle 100. Alternatively, the size adjustment factor can be added to the intersection point in the longitudinal direction 104 away from the vehicle 100.

In one or more arrangements, when the detected shape profile of the detected object has a substantially L-shaped profile, the size adjustment factor can be a predetermined distance. The predetermined distance can have any suitable value. For instance, the predetermined distance can be an average length of a vehicle. In one or more arrangements, the average length of a vehicle can be from about 4 meters to about 5 meters. In one or more arrangements, the predetermined distance can be about 4 meters. In one or more arrangements, the predetermined distance can be about 5 meters. However, any suitable predetermined distance can be used.

In some arrangements, the sensor system 125, the processor 110, and/or the object size adjustment module 140 can be configured to detect, determine, assess, monitor, measure, quantify and/or sense, directly or indirectly, one or more aspects, characteristics and/or properties of a detected object. For example, the sensor system 125, the processor 110, and/or the object size adjustment module 140 can be configured to detect, determine, assess, monitor, measure, quantify and/or sense, directly or indirectly, the size, relative size, length, width, height, a dimension, the material, a material property, the speed, the acceleration and/or the trajectory of a detected object. In one or more arrangements, one or more artificial or computational algorithms or machine learning methods can be used for such purposes.

The vehicle 100 can include one or more other modules. Such modules can be implemented as computer readable program code that, when executed by a processor, implement the various processes described herein. The modules can be a component of the processor 110, or the modules can be executed on and/or distributed among other processing systems to which the processor 110 is operatively connected. Various suitable modules can be included. Non-limiting examples of such modules will now be described.

The vehicle 100 can include a ground point filtering module. The ground point filtering module can be configured to filter data collected by the sensor system 125 to remove data corresponding to the ground. The ground point filtering module can be operatively connected to the one or more terrain data libraries to obtain terrain data for the driving environment of the vehicle, including a forward portion of the driving environment.

The vehicle 100 can include an obstacle candidate identification module. The obstacle candidate identification module can be configured to analyze data collected by the sensor system 125, such as the lidar sensor(s) 128, to group object data points together to determine obstacle candidates. The obstacle candidate identification module can be configured to use any suitable grouping technique. As an example, the obstacle candidate identification module can be configured to use one or more segmentation techniques, such as a graph-based segmentation algorithm. Some examples of suitable techniques to segment three dimensional point clouds into clusters are described in an article entitled "Efficient Graph-Based Image Segmentation" by P. Felzenszwalb et al., which is incorporated herein by reference. In one or more arrangements, such analyzing can be performed after the data points have been filtered by the ground point filtering module.

The vehicle 100 can include a location-based obstacle filtering module. The location-based obstacle filtering module can be configured to filter the obstacle candidates, as identified by the obstacle candidate identification module, to remove obstacle candidates that are not located on a road or are not located sufficiently close to a road. The location-based obstacle filtering module can be operatively connected to the one or more map data libraries to obtain map data for the driving environment of the vehicle, including a forward portion of the driving environment. The obstacle candidates can be compared to the map data from the map data libraries. If an obstacle candidate is not located on a road and/or is not located sufficiently close to a road, then the obstacle candidate can be filtered. If an obstacle candidate is located on a road and/or if it is located sufficient close to a road, then the obstacle candidate is not filtered. Further analysis of such obstacle candidates can be performed.

The vehicle 100 can include an object speed filtering module. The object speed filtering module can be configured to associate speed data with the one or more obstacle candidates. Such speed data can be obtained from any suitable source, such as the sensor system 125 and, more particularly, the one or more radar sensors 127. The object speed filtering module can be configured to filter the obstacle candidates to remove obstacle candidates that are moving at or above a predetermined speed threshold. The predetermined speed threshold can have any suitable value. As an example, the predetermined speed threshold can be about 1 meter per second. However, it will be understood that other values are possible.

In one or more arrangements, the autonomous driving module 120, the ground point filtering module, the obstacle candidate identification module, the obstacle filtering module, the object speed filtering module, and/or the processor 110 can be configured to analyze information/data captured by the sensor system 125 with respect to objects located in a forward portion of the external environment of the vehicle 100. For instance, one or more of the modules can analyze information/data captured by the sensor system 125 to determine whether the detected objects are objects of interest. In one or more arrangements, an object of interest is a substantially stationary object that is located on or sufficiently near a road. In one or more arrangements, an object of interest can be a parked or stationary vehicle on or along the side of a road.

The vehicle 100 can include one or more vehicle systems 147. Various examples of the one or more vehicle systems 147 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100.

The vehicle 100 can include a propulsion system 150, a braking system 155, a steering system 160, throttle system 165, a transmission system 170, a signaling system 175, and/or a navigation system 180. Each of these systems will be described in turn below.

The propulsion system 150 can include one or more mechanisms, devices, elements, components, systems, and/or combinations thereof, now known or later developed, configured to provide powered motion for the vehicle 100. The braking system 155 can include one or more mechanisms, devices, elements, components, systems, and/or combinations thereof, now known or later developed, configured to decelerate the vehicle 100. The steering system 160 can include one or more mechanisms, devices, elements, components, systems, and/or combinations thereof, now known or later developed, configured to adjust the heading of the vehicle 100. The throttle system 165 can include one or more mechanisms, devices, elements, components, systems, and/or combinations thereof, now known or later developed, configured to control the operating speed of an engine/motor of the vehicle 100 and, in turn, the speed of the vehicle 100.

The transmission system 170 can include one or more mechanisms, devices, elements, components, systems, and/or combinations thereof, now known or later developed, configured to transmit mechanical power from the engine/motor of the vehicle 100 to wheels or tires of the vehicle 100. The signaling system 175 can include one or more mechanisms, devices, elements, components, systems, and/or combinations thereof, now known or later developed, configured to provide illumination for the driver of the vehicle 100 and/or to provide information with respect to one or more aspects of the vehicle 100.

The navigation system 180 can include one or more mechanisms, devices, elements, components, systems, applications and/or combinations thereof, now known or later developed, configured to determine the geographic location of the vehicle 100 and/or to determine a travel route for the vehicle 100. The navigation system 180 can include one or more mapping applications to determine a travel route for the vehicle 100. The navigation system 180 can include a global positioning system, a local positioning system or a geolocation system.

The processor 110 and/or the autonomous driving module 120 can be operatively connected to communicate with the various vehicle systems 147 and/or individual components thereof. For example, returning to FIG. 1, the processor 110 and/or the autonomous driving module 120 can be in communication to send and/or receive information from the various vehicle systems 147 to control the movement, speed, maneuvering, heading, direction, etc. of vehicle 100. The processor 110 and/or the autonomous driving module 120 may control some or all of these vehicle systems 147 and, thus, may be partially or fully autonomous.

The processor 110 and/or the autonomous driving module 120 may be operable to control the navigation and/or maneuvering of the vehicle 100 by controlling one or more of the vehicle systems 147 and/or components thereof. For instance, when operating in an autonomous mode, the processor 110 and/or the autonomous driving module 120 can control the direction and/or speed of the vehicle 100. The processor 110 and/or the autonomous driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 145. The actuators 145 can be any element or combination of elements operable to modify, adjust and/or alter one or more of the vehicle systems 147 or components thereof to responsive to receiving signals or other inputs from the processor 110 and/or the autonomous driving module 120. Any suitable actuator can be used. For instance, the one or more actuators 145 can include motors, pneumatic actuators, hydraulic pistons, relays, solenoids, and/or piezoelectric actuators, just to name a few possibilities.

According to arrangements described herein, the vehicle 100 can be configured to sense a forward portion of the external environment. More particularly, the vehicle 100 can sense a forward portion of the external environment using the sensor system 125. The data collected by the sensor system 125 can be processed (e.g., filtering, grouping, etc.) to determine one or more objects of interest in the forward portion of the external environment. In one or more arrangements, the vehicle 100 can be configured to detect stationary objects (e.g., vehicles parked or otherwise stationary) located near or along a road. The vehicle 100 can take into account such objects and the size of such objects with respect to determining driving maneuvers.

Figure 2:
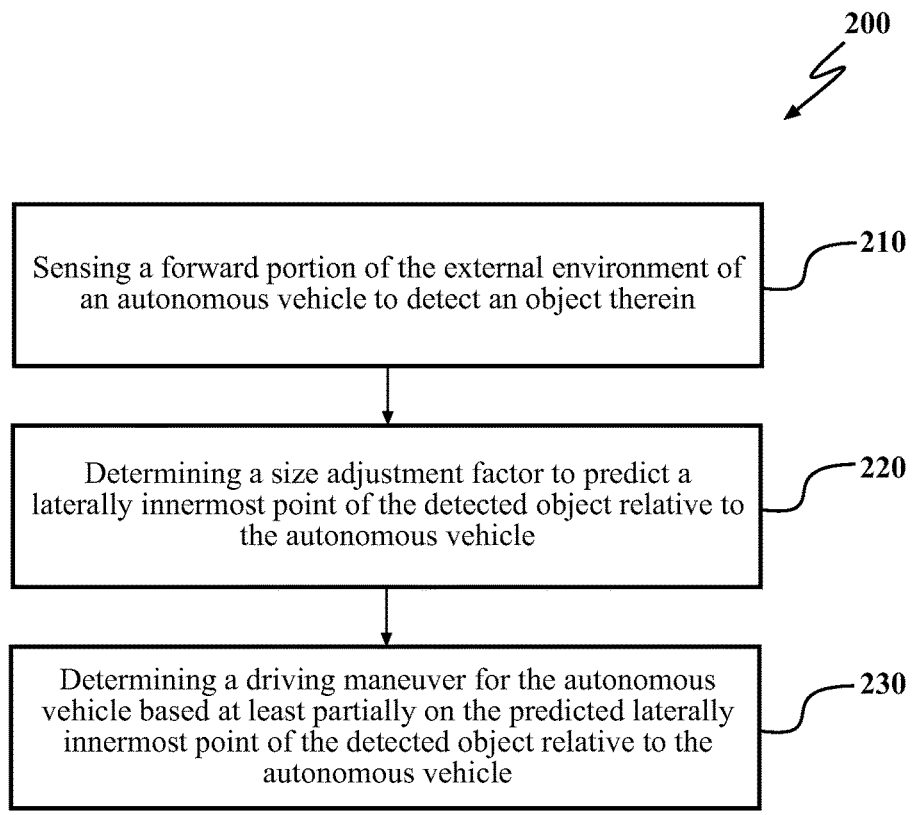
FIG. 2 is an example of a method of operating an autonomous vehicle relative to forward objects.

Now that the various potential systems, devices, elements and/or components of the vehicle 100 have been described, various methods of operating an autonomous vehicle will now be described. Referring now to FIG. 2, an example of a method of operating an autonomous vehicle relative to forward objects in an external environment is shown. Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, at least a forward portion of the external environment of the vehicle 100 can be sensed to detect an object therein. The detecting of at least a forward portion of the external environment can be performed in any suitable manner. For instance, the detecting of at least a forward portion of the external environment can be performed by one or more sensors of the sensor system 125, such as the lidar sensor(s) 128. In some arrangements, the detecting of the external environment can be performed continuously, at any suitable interval, irregularly, or randomly. The method 200 can continue to block 210.

At block 220, a size adjustment factor can be determined to predict a laterally innermost point of the detected object relative to the autonomous vehicle 100. The determination of the size adjustment factor and/or the laterally innermost point of the detected object relative to the autonomous vehicle 100 can be performed by the object size adjustment module 140 and/or the processor 110. The method 200 can continue to block 230.

At block 230, a driving maneuver for the autonomous vehicle can be determined based at least partially on the predicted laterally innermost point of the detected object relative to the autonomous vehicle. The driving maneuver can be determined by, for example, the autonomous driving module 120 and/or the processor 110. The driving maneuver can be any suitable maneuver or group of maneuvers. For instance, the driving maneuver can include moving the autonomous vehicle in the lateral direction 106 away from the predicted laterally innermost point of the detected object relative to the autonomous vehicle. As another example, the driving maneuver can be maintaining a predetermined distance or a predetermined minimum distance between the vehicle 100 and the predicted laterally innermost point of the detected object in the lateral direction 106.

The method 200 can end. Alternatively, the method 200 can return to block 210. As a further alternative, the method 200 can include additional and/or alternative blocks (not shown). For instance, the method can include causing the autonomous vehicle to implement the determined driving maneuver. The autonomous vehicle 100 can be caused to implement the determined driving maneuver. The processor 110 and/or the autonomous driving module 120 can be operatively connected to one or more of the vehicle systems 147 to implement the determined driving maneuver. In one or more arrangements, the processor 110 and/or the autonomous driving module 120 can be operable to control the one or more actuators 145, which can control one or more of the vehicle systems 147 or portions thereof to implement the determined driving maneuver.

Non-limiting examples of the operation of the vehicle in accordance with the method 200 will now be described in relation to FIGS. 3-7. For purposes of these examples, the vehicle 100 can be traveling in an environment 300 (FIG. 3), 301 (FIG. 5), 302 (FIG. 7). The vehicle 100 can be traveling on a road 310. "Road" means a thoroughfare, route, path or way between two places and upon which a vehicle can travel. The road 310 may be paved or otherwise improved to facilitate travel by a vehicle thereon. In some instances, the road 310 may be unpaved or undeveloped. The road 305 may be a public road or a private road. The road 310 can include or be a part of one or more bridges, tunnels, supporting structures, junctions, crossings, interchanges, and toll roads.

The road 310 can be designated for one way travel or two way travel. In the examples shown, the road 310 can include a first travel lane 320 and a second travel lane 340. A "travel lane" is a portion of a road that is designated for use by a single line of vehicles and/or a portion of a road that is being used by a single line of vehicles. In some instances, the one or more travel lanes 320, 340 can be designated by markings on the road 315 or in any other suitable manner. In some instances, the one or more travel lanes 320, 340 may not be marked.

For purposes of this example, vehicles can move in a first direction 330 in at least the first travel lane 320. The road 310 can also include a roadside parking area, which can be designated by markings 360. The roadside parking area can be adjacent to the first travel lane 320.

In these examples, the current travel lane of the vehicle 100 can be the first travel lane 320. "Current travel lane" means a travel lane that a vehicle is traveling on at the present time. The vehicle 100 can sense the external environment 300, 301, 302, such as by using the sensor system 125 (e.g., the lidar sensor(s) 128). More particularly, the vehicle 100 can sense at least a forward portion of the external environment. The vehicle 100 can detect the presence of one or more objects located in the forward environment (e.g., parked vehicle 350).

However, due to the resolution of the lidar sensor(s) 128, the data points collected by the lidar sensor(s) 128 may not provide sufficient information about the size of the vehicle 350. The vehicle 100 can determine a size adjustment factor. The size adjustment factor can be used to predict a laterally innermost point of the vehicle 350 relative to the vehicle 100. Various examples of the shape profiles for the vehicle 350, the determination of the size adjustment factor, and the determination of the laterally innermost point of the vehicle 350 relative to the vehicle 100 will now be described.

Figure 3:
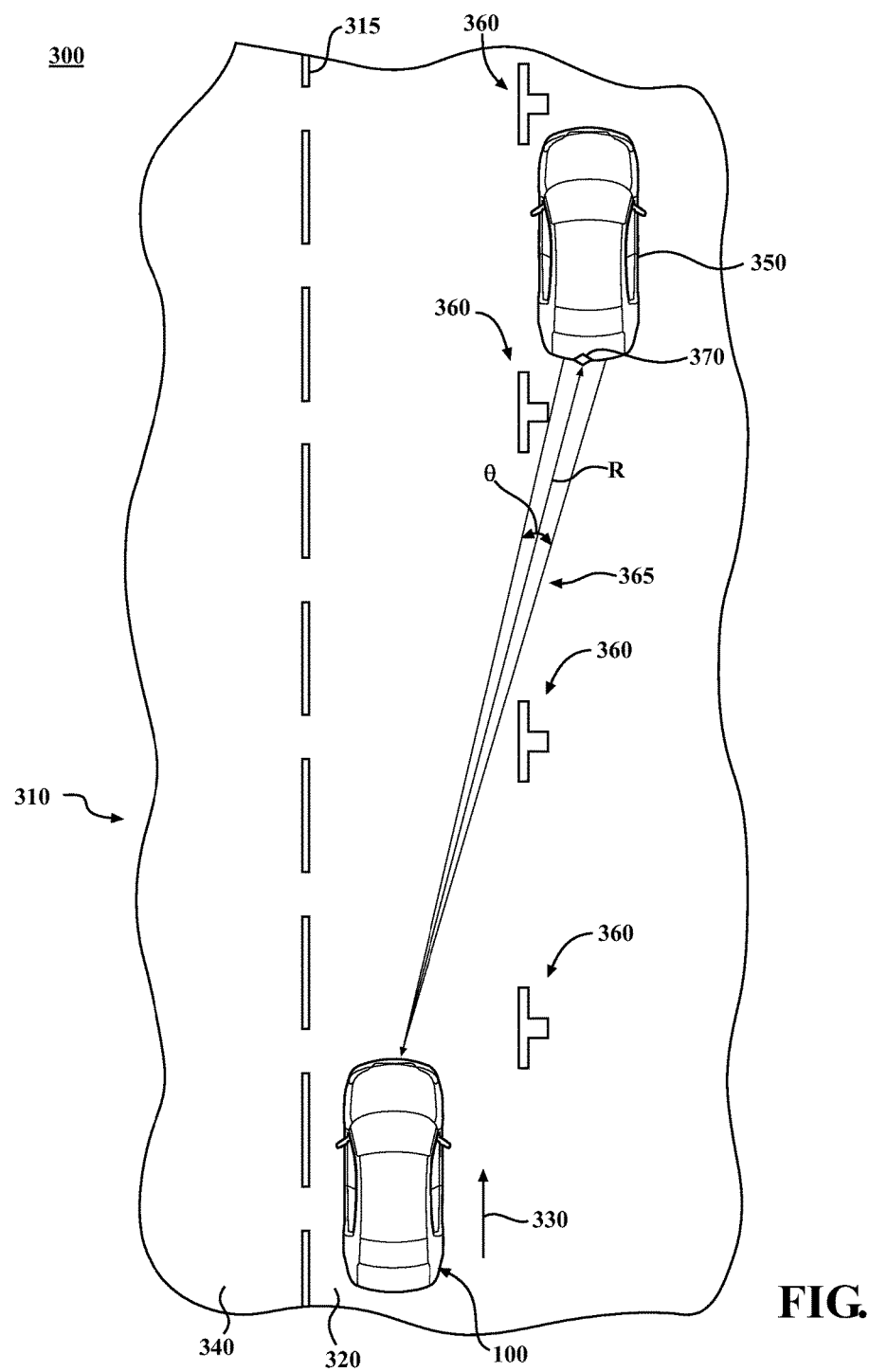
FIG. 3 is an example of a driving environment in which a forward vehicle is parked in a parking space adjacent to a current travel lane of the autonomous vehicle, showing the forward vehicle oriented substantially parallel to the current travel lane of the autonomous vehicle.
Figure 4:
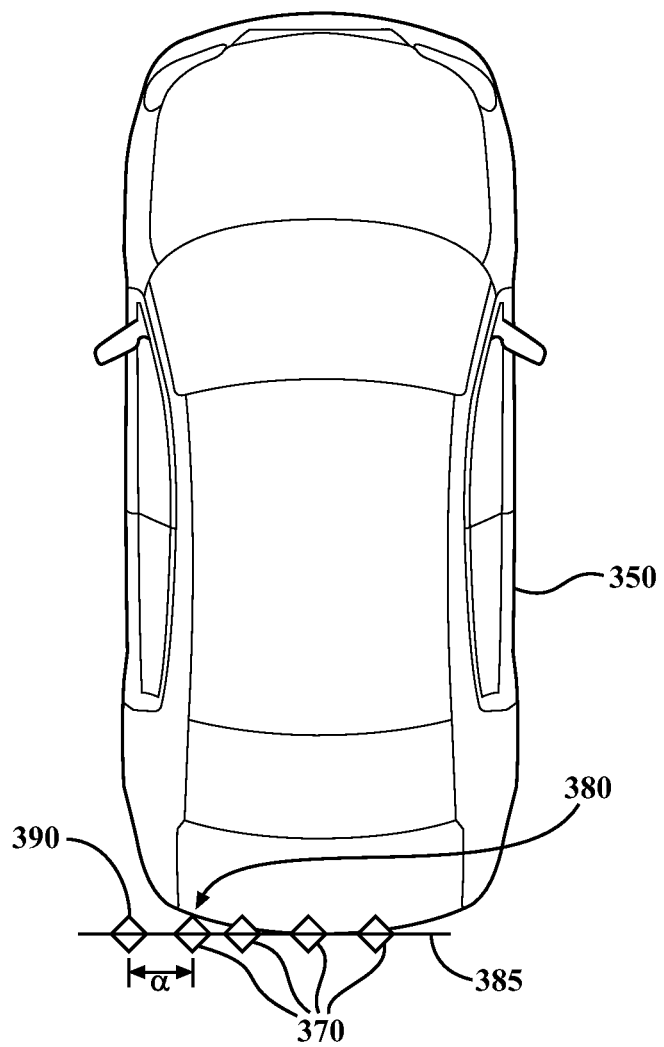
FIG. 4 is an example of the forward vehicle of FIG. 3, wherein a plurality of sensor detection points of the forward vehicle have a substantially linear profile.

Referring to FIGS. 3 and 4, the vehicle 350 can be oriented substantially parallel with the first travel lane 320. A plurality of points 370 of the vehicle 350 can be detected by the lidar sensor(s) 128. Each point can be detected by two laser signals, including a first laser signal 371 and a second laser signal 372. The first and second laser signals 371, 372 can originate from the same laser source. The first and second laser signals 371, 372 are non-parallel to each other. As a result, a resolution angle ($\theta$) is defined between them. Further, the distance between the laser signal source and the detected point can have an associated distance R.

As shown in FIG. 4, the plurality of points 370 can be in a generally linear arrangement. In one or more arrangements, a line 385 can be fit to the plurality of points, as is shown in FIG. 4. Any suitable line fitting technique can be used. The plurality of points 370 can include a laterally innermost detected point 380 relative to the vehicle 100.

However, as noted herein, the laterally innermost detected point 380 may not be the actual laterally innermost point of the vehicle 350. Such a difference between the detected laterally innermost point and the actual innermost point can be due to the resolution of the lidar sensor(s) 128. Accordingly, a size adjustment factor can be determined to predict a laterally innermost point of the vehicle 350 relative to the vehicle 100.

The determination of the size adjustment factor can be based on a detected shape profile of the detected object. In this example, when the shape profile of the vehicle 350 can be substantially linear, the size adjustment factor ($\alpha$) can be a predefined distance. In one or more arrangements, the size adjustment factor ($\alpha$) can be determined according to the following equation: $R*\sin(\theta/2)$.

The vehicle 100 can be configured to determine the laterally innermost detected point 380 relative to the vehicle 100. The size adjustment factor ($\alpha$) can be added to the laterally innermost detected point 380 in a predetermined direction. For instance, the predetermined direction can be along the line toward the vehicle 100. As another example, the predetermined direction can be in the lateral direction 106 of the vehicle 100 and in the direction of the vehicle 100. In this way, an adjusted laterally innermost point 390 of the vehicle 350 relative to the vehicle 100 can be determined. The vehicle 100 can be configured such that the predicted size of the vehicle 350 (or at least the laterally innermost point) is not less than the actual size of the vehicle 350 (or at least the laterally innermost point). However, in some instances, the predicted size of the vehicle 350 (or at least the laterally innermost point) can be less than or more than the actual size of the vehicle 350 (or at least the laterally innermost point).

Figure 5:
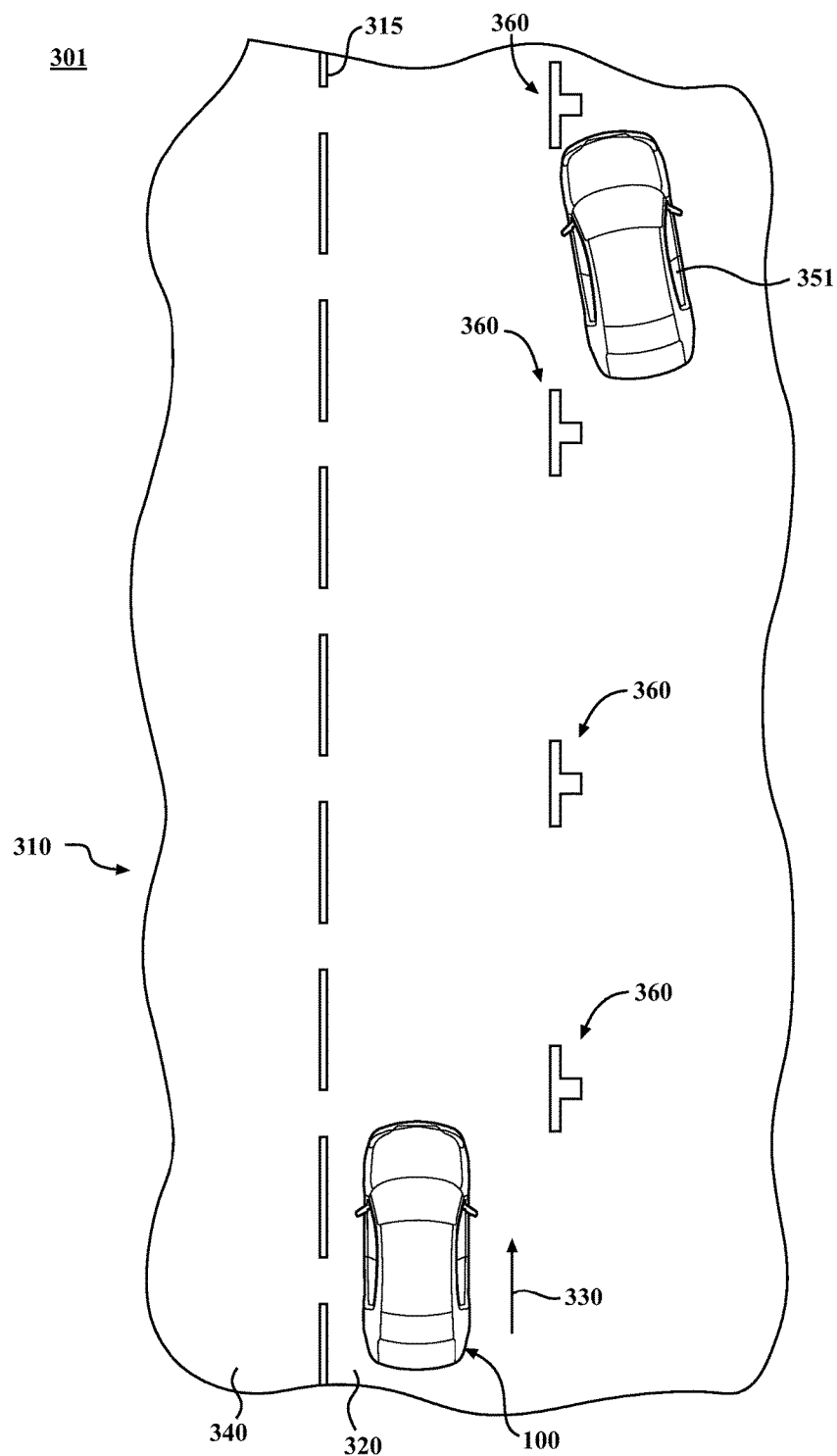
FIG. 5 is an example of a driving environment in which a forward vehicle is parked in a parking space adjacent to a current travel lane of the autonomous vehicle, showing the forward vehicle oriented non-parallel to the current travel lane of the autonomous vehicle.
Figure 6:
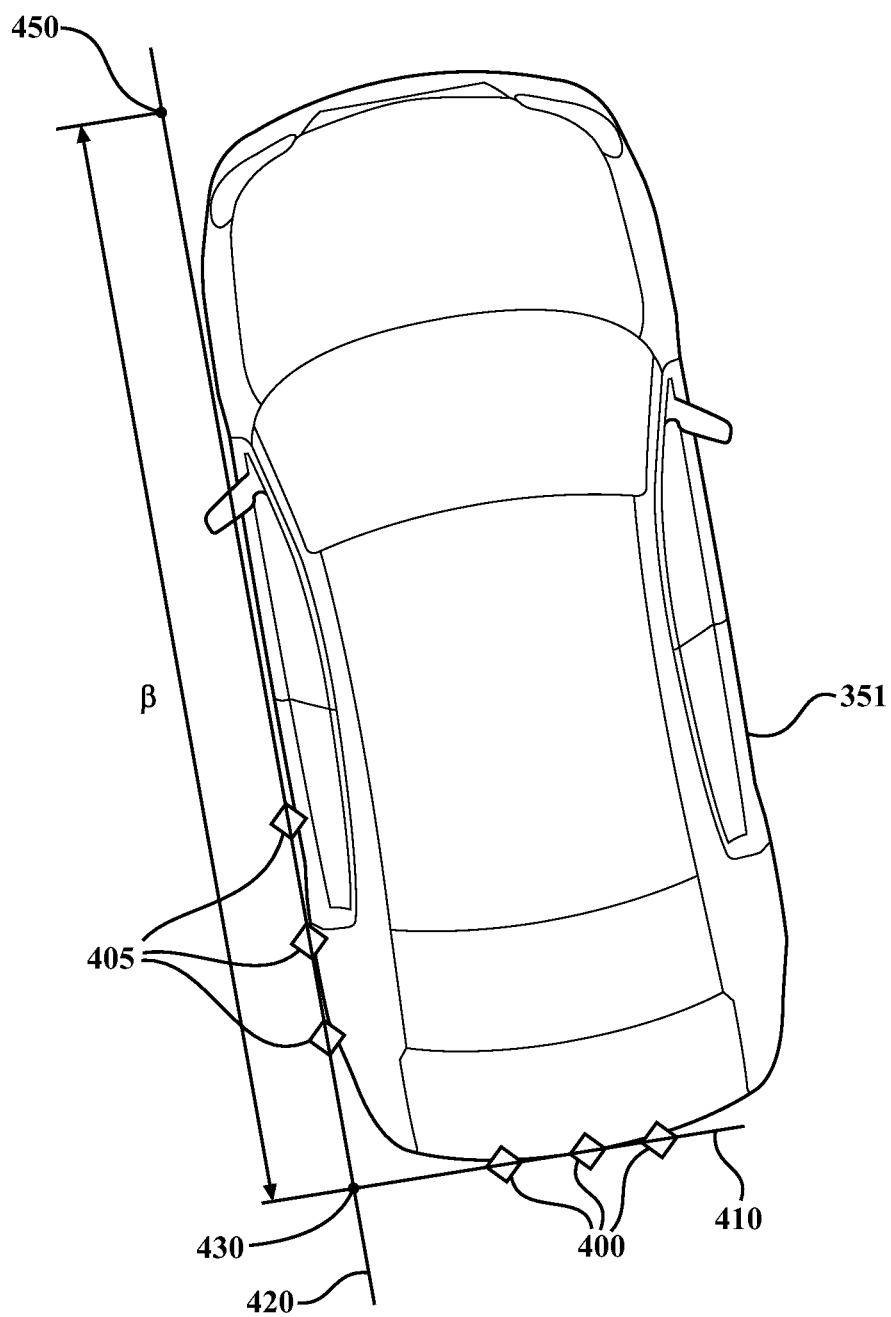
FIG. 6 shows an example of the forward vehicle of FIG. 3, wherein a plurality of sensor detection points of the forward vehicle have an L-shaped profile.
Figure 7:
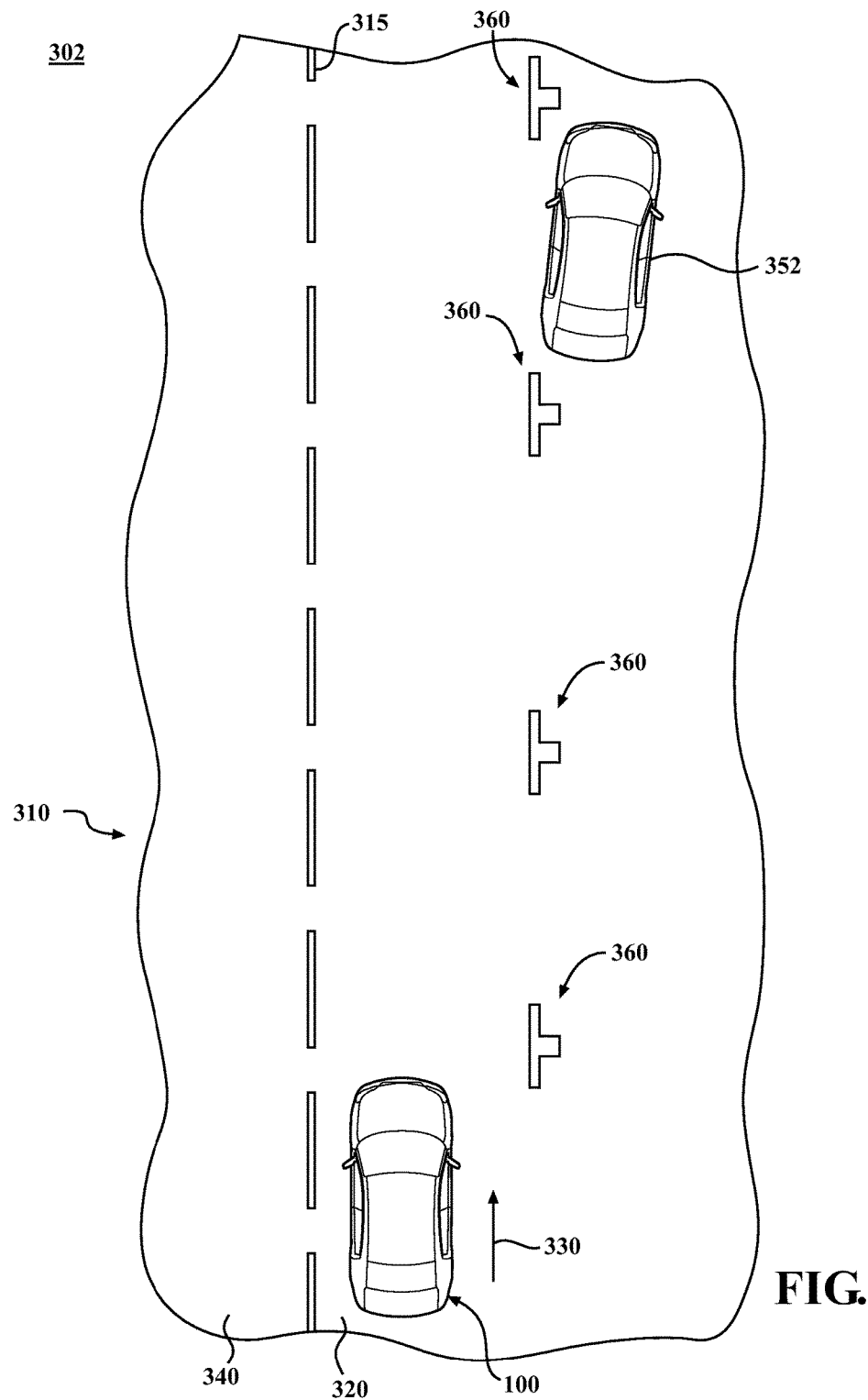
FIG. 7 is an example of a driving environment in which a forward vehicle is parked in a parking space adjacent to a current travel lane of the autonomous vehicle, showing the forward vehicle oriented non-parallel to the current travel lane of the autonomous vehicle.

Referring to FIGS. 5 and 6, a vehicle 351 can be oriented such that the front end of the vehicle 352 is angled toward from the first travel lane 320. A plurality of points of the vehicle 350 can be detected by the lidar sensor(s) 128. As shown in FIG. 6, the plurality of points can be in a generally L-shaped arrangement. A first plurality of points 400 can be in a generally linear arrangement, and a second plurality of points 405 can be in a generally linear arrangement. In one or more arrangements, a first line 410 can be fit to the first plurality of points 400, and a second line 420 can be fit to the second plurality of points 405. Any suitable line fitting technique can be used.

The second line 420 can be transverse to the first line 410, thereby forming an L-shape. An intersection point 430 can be formed between the first line 410 and the second line 420. It will be appreciated that the intersection point 430 does not defined the actual laterally innermost point of the vehicle 351 due, at least in part, to the orientation of the vehicle 351. Indeed, the intersection point 430 is related to the back end of the vehicle 351. Accordingly, a size adjustment factor can be determined to predict a laterally innermost point of the vehicle 351 relative to the vehicle 100.

The size adjustment factor ($\beta$) can be a predetermined distance. The size adjustment factor ($\beta$) can be added to the intersection point 430 in a predetermined direction. For instance, the predetermined direction can be along the second line 420. As another example, the predetermined direction can be in the longitudinal direction 104 away of the vehicle 100. In this way, a laterally innermost point 450 of the vehicle 351 relative to the vehicle 100 can be determined. The vehicle 100 can be configured such that the predicted size of the vehicle 351 (or at least the laterally innermost point) is not less than the actual size of the vehicle 351 (or at least the laterally innermost point).

Referring to FIG. 7, a vehicle 352 can be oriented such that the front end of the vehicle 352 is angled away from the first travel lane 320. In such case, the plurality of points collected by the lidar sensor(s) 128 can be in a generally linear arrangement. Accordingly, the above description of determining the laterally innermost point of the vehicle 350 made in connection with FIGS. 3 and 4 applies equally to the determination of the laterally innermost point of the vehicle 352.

It should be noted that FIGS. 3-7 are directed to examples in which objects (e.g., vehicles 350, 351, 352) are located on the right side of the vehicle 100. However, it will be understood that arrangements described herein are not limited in this respect. Indeed, arrangements described herein can be used, alternatively or in addition, in connection with objects located on the left side of the vehicle 100. Further, arrangements described herein can be used in connection with objects located at long distances relative to the vehicle 100 (e.g., at least about 80 meters away). Arrangements described herein can also be used in connection with objects located at intermediate or at short distances relative to the vehicle 100. Still further, it will be appreciated that arrangements have been described herein to estimate the size of stationary objects, it will be understood that such arrangements can be used to estimate the size of non-stationary objects as well.

It will be appreciated that arrangements described herein can provide numerous benefits, including one or more of the benefits mentioned herein. For example, arrangements described herein can improve the performance of an autonomous vehicle. By detecting such objects, the autonomous vehicle can make smooth driving maneuvers well in advance of encountering such objects. Arrangements described herein can improve safety for autonomous vehicles by avoiding collisions with stationary objects along a road (e.g., parked or stopped vehicles on a road or on a side of the road) and/or by avoiding sudden or drastic driving maneuvers (e.g., hard breaks, swerves, etc.). Further, arrangements described herein can increase the overall comfort level of vehicle occupants.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of operating an autonomous vehicle relative to forward objects, the method comprising:
sensing, using one or more sensors, a forward portion of the external environment of the autonomous vehicle to detect an object therein;
determining, using one or more processors, a size adjustment factor to predict a laterally innermost point of the detected object relative to the autonomous vehicle;
determining, using one or more processors, a driving maneuver for the autonomous vehicle based at least partially on the predicted laterally innermost point of the detected object relative to the autonomous vehicle; and
causing the autonomous vehicle to implement the determined driving maneuver.

2. The method of claim 1, wherein the driving maneuver includes moving the autonomous vehicle laterally away from the predicted laterally innermost point of the detected object relative to the autonomous vehicle.

3. The method of claim 1, wherein sensing the forward portion of the external environment of the autonomous vehicle to detect the object therein includes sensing the forward portion of the external environment of the autonomous vehicle to detect the object therein using one or more lidar sensors.

4. The method of claim 1, wherein determining the size adjustment factor to predict a laterally innermost point of the detected object relative to the autonomous vehicle is based on a detected shape profile of the detected object.

5. The method of claim 4, wherein, when the detected shape profile of the detected object is substantially linear, determining the size adjustment factor to predict a laterally innermost point of the detected object relative to the autonomous vehicle includes:
identifying a laterally innermost detected point relative to the autonomous vehicle; and
adding the size adjustment factor to the laterally innermost detected point in the direction of the substantially linear shape profile toward the autonomous vehicle.

6. The method of claim 5, wherein the size adjustment factor is a predetermined distance defined by $R*\sin(\theta/2)$, wherein R is the distance between a sensor of the autonomous vehicle and the laterally innermost detected point relative to the autonomous vehicle, and wherein $\theta$ is the sensor resolution angle.

7. The method of claim 4, wherein, when the detected shape profile of the detected object is substantially L-shaped having a first substantially linear portion and a second substantially linear portion that is transverse to the first substantially linear portion, determining the size adjustment factor to predict a laterally innermost point of the detected object relative to the autonomous vehicle includes:
identifying an intersection point formed between the first substantially linear portion and a second substantially linear portion; and
adding the size adjustment factor to the laterally innermost detected point in the lateral direction toward the autonomous vehicle.

8. The method of claim 7, wherein the size adjustment factor is a predetermined distance defined extending from the intersection point in the direction of the first substantially linear portion away from the vehicle.

9. The method of claim 8, wherein the predetermined distance is an average vehicle length, and wherein the average vehicle length is from substantially 4 meters to substantially 5 meters.

10. A system for operating an autonomous vehicle relative to forward objects, the system comprising:
a sensor system configured to sense at least a forward portion of the external environment to detect an object located forward of the autonomous vehicle; and
a processor operatively connected to the sensor system, the processor being programmed to initiate executable operations comprising:
determining a size adjustment factor to predict a laterally innermost point of the detected object relative to the autonomous vehicle; and
determining a driving maneuver for the autonomous vehicle based at least partially on the predicted laterally innermost point of the detected object relative to the autonomous vehicle.

11. The system of claim 9, wherein the executable operations further include:
causing the autonomous vehicle to implement the determined driving maneuver.

12. The system of claim 9, wherein the sensor system includes one or more lidar sensors, wherein the one or more lidar sensors are used to detect an object located forward of the autonomous vehicle.

13. The system of claim 9, wherein determining the size adjustment factor to predict a laterally innermost point of the detected object relative to the autonomous vehicle is based on a detected shape profile of the detected object.

14. The system of claim 13, wherein, when the detected shape profile of the detected object is substantially linear, determining the size adjustment factor to predict a laterally innermost point of the detected object relative to the autonomous vehicle includes:
identifying a laterally innermost detected point relative to the autonomous vehicle; and
adding the size adjustment factor to the laterally innermost detected point in the lateral direction toward the autonomous vehicle.

15. The system of claim 14, wherein the size adjustment factor is a predetermined distance defined by $R*\sin(\theta/2)$, wherein R is the distance between a sensor of the autonomous vehicle and the laterally innermost detected point relative to the autonomous vehicle, and wherein $\theta$ is the sensor resolution angle.

16. The system of claim 13, wherein, when the detected shape profile of the detected object is substantially L-shaped having a first substantially linear portion and a second substantially linear portion that is transverse to the first substantially linear portion, determining the size adjustment factor to predict a laterally innermost point of the detected object relative to the autonomous vehicle includes:
identifying an intersection point formed between the first substantially linear portion and a second substantially linear portion; and
adding the size adjustment factor to the laterally innermost detected point in the lateral direction toward the autonomous vehicle.

17. The system of claim 16, wherein the size adjustment factor is a predetermined distance defined extending from the intersection point in the direction of the first substantially linear portion away from the vehicle.

18. A computer program product for operating an autonomous vehicle relative to forward objects, the computer program product comprising a non-transitory computer readable storage medium having program code embodied therein, the program code executable by a processor to perform a method comprising:

detecting an object located forward of the autonomous vehicle;

determining a size adjustment factor to predict a laterally innermost point of the detected object relative to the autonomous vehicle;

determining a driving maneuver for the autonomous vehicle based at least partially on the predicted laterally innermost point of the detected object relative to the autonomous vehicle; and causing the autonomous vehicle to implement the determined driving maneuver.

\* \* \* \* \*

UNITED STATES PATENT AND TRADEMARK OFFICE
CERTIFICATE OF CORRECTION

PATENT NO.           : 9,616,886 B2
APPLICATION NO.      : 14/801019
DATED                : April 11, 2017
INVENTOR(S)          : Xue Mei et al.

It is certified that error appears in the above-identified patent and that said Letters Patent is hereby corrected as shown below:

In the Claims

In Claim 11, Column 18, Line 20: delete "claim 9" and insert --claim 10--.

In Claim 12, Column 18, Line 24: delete "claim 9" and insert --claim 10--.

In Claim 13, Column 18, Line 28: delete "claim 9" and insert --claim 10--.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*